United States Patent
Hooshmand et al.

(10) Patent No.: US 9,568,901 B2
(45) Date of Patent: Feb. 14, 2017

(54) MULTI-OBJECTIVE ENERGY MANAGEMENT METHODS FOR MICRO-GRIDS

(71) Applicants: Ali Hooshmand, Campbell, CA (US); Ratnesh Sharma, Fremont, CA (US); Babak Asghari, Sunnyvale, CA (US)

(72) Inventors: Ali Hooshmand, Campbell, CA (US); Ratnesh Sharma, Fremont, CA (US); Babak Asghari, Sunnyvale, CA (US)

(73) Assignee: NEC Corporation (JP)

( * ) Notice: Subject to any disclaimer, the term of this patent is extended or adjusted under 35 U.S.C. 154(b) by 622 days.

(21) Appl. No.: 13/858,033

(22) Filed: Apr. 6, 2013

(65) Prior Publication Data

US 2014/0058571 A1 Feb. 27, 2014

Related U.S. Application Data

(60) Provisional application No. 61/693,466, filed on Aug. 27, 2012.

(51) Int. Cl.
  *G05B 15/02* (2006.01)
  *H02J 3/00* (2006.01)

(52) U.S. Cl.
  CPC ............. *G05B 15/02* (2013.01); *H02J 3/00* (2013.01); *H02J 2003/003* (2013.01); *Y04S 10/54* (2013.01)

(58) Field of Classification Search
  CPC ....... G05B 15/02; H02J 3/00; H02J 2003/003; Y04S 10/54
  USPC .......................................................... 700/286
  See application file for complete search history.

(56) References Cited

U.S. PATENT DOCUMENTS

| | | | |
|---|---|---|---|
| 2010/0121587 A1* | 5/2010 | Vian | G01R 31/3651 702/63 |
| 2011/0082598 A1* | 4/2011 | Boretto | G06Q 10/06 700/291 |
| 2011/0231028 A1* | 9/2011 | Ozog | G06Q 10/06 700/291 |
| 2013/0024042 A1* | 1/2013 | Asghari | H02J 3/381 700/295 |
| 2013/0030784 A1* | 1/2013 | Viassolo | G06Q 10/00 703/18 |
| 2013/0079939 A1* | 3/2013 | Darden, II | G06Q 10/063 700/291 |

OTHER PUBLICATIONS

S.A. Pourmousavi, Ratnesh K. Sharma, Babak Asghari, "A Framework for Real-Time Power Management of a Grid-Tied Microgrid to Extend Battery Lifetime and Reduce Cost of Energy", Jan. 16-20, 2012, Innovative Smar Grid Technologies(ISGT) 2012 IEEE, pp. 1-4.*

(Continued)

*Primary Examiner* — Miranda Huang
*Assistant Examiner* — Alan Chu
(74) *Attorney, Agent, or Firm* — Joseph Kolodka

(57) ABSTRACT

Systems and methods are disclosed for multi-objective energy management of micro-grids. A two-layer control method is used. In the first layer which is the advisory layer, a Model Predictive Control (MPC) method is used as a long term scheduler. The result of this layer will be used as optimality constraints in the second layer. In the second layer, a real-time controller guarantees a second-by-second balance between supply and demand subject to the constraints provided by the advisory layer.

17 Claims, 8 Drawing Sheets

(56) References Cited

OTHER PUBLICATIONS

Drouilhet S., "A Battery Life Prediction Method for Hybrid Power Applcations", NREL, Jan. 1997, p. 1-16.*
Jin Chenrui, "Coordinated usage of distributed sources for energy cost saving in micro-grid", IEEE, Aug. 6, 2011, p. 1-7.*

* cited by examiner

MULTI-OBJECTIVE ENERGY MANAGEMENT METHODS FOR MICRO-GRIDS

This application is a non-provisional of and claims priority to provisional application Ser. No. 61693466 filed on Aug. 27, 2012, the content of which is incorporated by reference.

BACKGROUND

The present invention relates to multi-objective energy management methods for micro-grids.

A micro-grid is the integration of loads, energy resources, and storage devices. From the operating point of view, a micro-grid is counted as one independent entity which is able to work either in grid-tied or islanded mode. Micro-grid's energy resources can include utility connection, micro-gas turbines and renewable generations such as fuel cells, wind turbines, and solar panels. It is expected and desirable that a considerable amount of demand for each micro-grid is supplied by its own renewable generations. On the other hand, the intermittent nature of most distributed generations (DGs) such as wind and photovoltaic (PV) introduces a significant uncertainty in the operation of a micro-grid. This makes the conventional unit commitment more erroneous and unreliable. Therefore, a real-time management framework as a supervisory control is an absolute necessary procedure within a micro-grid similar to the various regulatory actions in conventional power systems. The first objective for this management system is real-time dispatching of energy generations in a way that minimizes the operational cost while it guarantees the balance between supply and demand at the presence of unpredictable variations of DGs.

In order to relax the issue of sudden unpredicted unbalances between supply and demand, energy storage devices are normally utilized. Among various types of storage devices, batteries are most favorable option and also the most expensive component of micro-grid. In grid-tied micro-grids, any shortage in the supply side (power outputs from DGs and the scheduled power from the grid) should be met whether by the battery or by purchasing extra power from the grid or a combination of both. At the first glance, it might be preferred to use battery first since it is charge free. But irregular usage pattern of batteries shortens their life span and may cause a replacement cost for batteries. Three parameters affect batteries' life: 1—Depth of discharge (DoD) 2—Discharge power and 3—temperature.

It is expected and desirable that a considerable amount of demand for each micro-grid is supplied by its own local generations. The intermittent nature of most distributed generations (DGs) introduces a significant uncertainty in the operation of a micro-grid. Having more comprehensive forecasting about the renewable generations, we are able to manage the micro-grid more efficient. Hence, a long term predictive controller seems to be necessary to make the optimal decisions based on long term forecasted profiles of renewables and load. On the other hand, we need a real-time manager. It means the controller should be able to guarantee the second-by-second balance between supply and demand and deal with all fluctuations in the system. Hence, as the first problem, a management system is required to optimize both long term predictive control objective and real-time control objective simultaneously.

In order to relax the issue of sudden unpredicted unbalances between supply and demand, battery is normally utilized which is also the most expensive component of micro-grid. On the other hand, irregular usage pattern of battery shortens its life span and may cause a replacement cost for battery. Based on this idea, in micro-grids operation, it should be tried to utilize battery's power in a way that maximizes their lifetime. Therefore, maximizing the battery lifetime is an important objective that should be considered besides the energy cost minimization objective in the operation of micro-grids. Therefore, as the second problem, a multi-objective management system is needed to optimize the battery lifetime and energy cost at the same time.

Previous attempts were based on passive control of energy storage units. An example is schedule-based control in which a storage unit charges and discharges at certain times during the day. There are also some other researches which attempt to optimize the operation of micro-grid by solving an optimization problem. But they just consider and minimize the energy cost of operation; thus they cannot guarantee an optimal operation of the storage unit.

SUMMARY

Systems and methods are disclosed for multi-objective energy management of micro-grids. A two-layer control method is used. In the first layer which is the advisory layer, a Model Predictive Control (MPC) method is used as a long term scheduler. The result of this layer will be used as optimality constraints in the second layer. In the second layer, a real-time controller guarantees a second-by-second balance between supply and demand subject to the constraints provided by the advisory layer.

In another aspect, a method for multi-objective management of a storage device, includes generating a battery power cost model; generating an energy cost model; controlling a charge or discharge of the battery storage device; and dispatching energy sources from a micro-grid to minimize a marginal cost of operation and maximize the storage unit lifetime. The MPC can used as the micro-grid performance optimizer. In order to integrate the energy cost minimization and battery life maximization objective functions into the MPC optimization problem, the battery life maximization problem is translated into a minimization one. By this translation, a multi-objective optimization problem over a finite time horizon is obtained. In addition, the closed-loop nature of MPC makes the management system to be robust and reliable against errors in renewable generation and load forecasting.

Advantages of the preferred embodiments may include one or more of the following. The preferred embodiment provides a lower electricity cost for energy systems because maximizing the revenues from energy storage utilization is a built-in feature of the proposed controller. It also provides customers with a management system in which equipment particularly storage units last longer in compare to other methods. The present invention is compatible with different electricity tariffs which result in plug-and-play feature and minimizes the installation cost. Also, it provides robust real-time control capability of electricity flow in the system which results in a cost-effective response to contingencies (such as changes in weather condition and load variations. Finally, the two-layer management system can further reduce the energy cost since its advisory layer determines the optimal decisions over a long horizon of optimization. The system manages the micro-grids operation and utilizes the batteries' power in a way that maximizes their life time. Thus, the system performs both maximizing the batteries' life span and minimizing the micro-grid's operational cost.

For maximizing the batteries' life time in parallel to minimizing the cost of energy, micro-grid's central controller determines the best pattern for charging and discharging the batteries. This can be done with information about time-of-use grid electricity rates, forecasted load profile, and predicted renewable generations level. Using these information, management system solves an optimization problem which results in optimal usage of batteries.

DESCRIPTION

Multi-objective energy management methods are disclosed for micro-grids that include local generations, grid connection, energy storage units and various loads. Minimization of energy cost and maximization of battery's lifetime are considered as two objectives which should be optimized simultaneously. Model predictive control (MPC) policy is utilized for solving the optimization problem and real-time implementation in a closed-loop framework. MPC is a class of control policies which uses a model that projects the behavior of system. Based on this model, controller can predict the future response of the system to various control actions; and based on this prediction, makes the optimal solution. For problems such as power system dispatching which highly depends on forecasted value of demand and renewable energy productions, this method can be effective. In addition, due to its important characteristic which is its close-loop nature, it corrects any in error in load and renewable generations' forecasting in the next iteration and so, extremely helps system stability and robustness. Furthermore, MPC can be appropriately embedded into the real-time management framework since it works dynamically and based on receding horizon control policy. Finally, it should be noticed that MPC is one of the few algorithms which can handle dynamic constraints such as batteries' state of charge (SoC) difference equation. Hence, the challenge of this paper is to propose a novel multi-objective optimization problem for real-time managing of micro-grids via implementation of model predictive control strategy.

Figure 1:
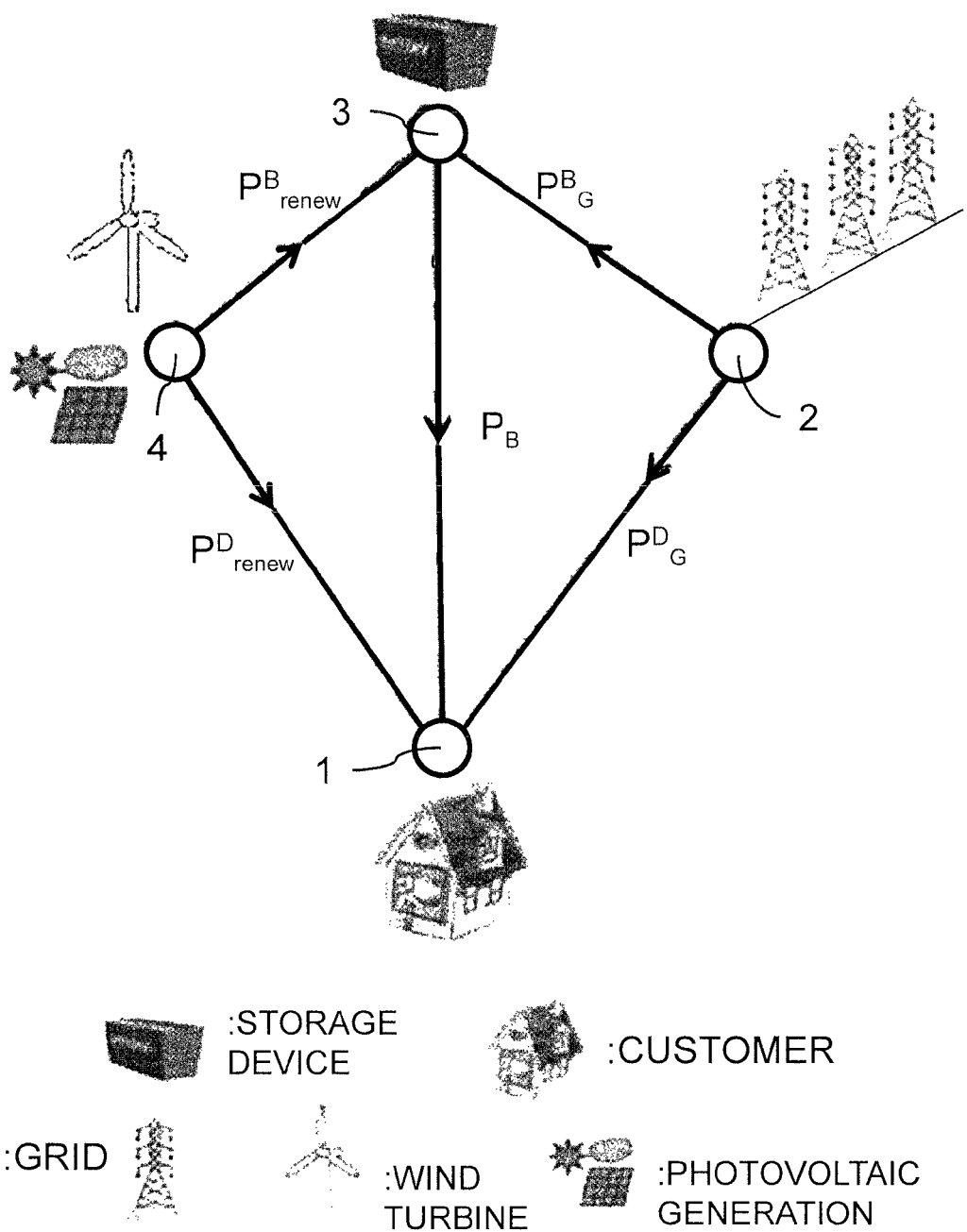
FIG. 1 represents an exemplary micro-grid.

In one embodiment, the micro-grid is modeled as a directed graph which includes four nodes as illustrated in FIG. 1. First node represents demand. The profile of demand, D(t), is assumed to be forecasted perfectly and without any prediction error. Node 2 is imported power from the grid, $P_G(t)$ which can be sent directly to demand node, $P_G^D(t)$, (from node 2 to node 1 in FIG. 1), and/or stored in battery, $P_G^B(t)$ (from node 2 to node 3). Hence, at each time, t,:

$$P_G(t) = P_G^D(t) + P_G^B(t) \quad (1)$$

Node 4 represents total generated power by renewable sources such as PV and wind turbine, $P_{renew}(t)$. Since this power is uncontrollable with almost free marginal cost, it should be tried to consume it directly by load, $P_{renew}^D(t)$ (from node 4 to node 1 in FIG. 1), and/or store it in the battery, $P_{renew}^B(t)$ (from node 4 to node 3), as much as possible. Finally, node 3 is storage device node which is a package of battery in this paper. As mentioned, the battery can be charged by renewable source, $P_{renew}^B(t)$, and grid power, $P_G^B(t)$. $P_B(t)$ is battery discharge power which goes from node 3 to node 1 in FIG. 1) for supplying the load. Considering the micro-grid's directed graph and its elements, we design an optimization problem in order to optimally dispatch different energy sources within the micro-grid. Similar to other optimization problems, the proposed mathematical formulation has two main parts: Objective function which should be optimized, and static and dynamic constraints of micro-grid which should be satisfied.

For the above micro-grid, the system optimizes two variables: 1—Minimizing the cost of energy, 2—Maximizing the battery lifetime.

1) Cost of Energy: In every power dispatching problem, primary objective is to schedule the generators output to reliably supply the power requested by end users. This scheduling should be implemented in a cost-efficient way. In one system, cost of energy is the cost of importing power from the grid. Hence, first objective function $J_1$ is the grid power cost over the optimization window. We assume the marginal cost of grid power for any level of generation is constant. Therefore, J1 is simply modeled by a linear equation as follows:

$$J_1 := \sum_{i=0}^{T} C_G(t) P_G(t) \quad (2)$$

in which T is optimization horizon, $P_G(t)$ is imported power from grid at time t, and $C_G(t)$ is grid power price at time t that is extracted based on time-of-use grid electricity rates information.

2) Battery's Lifetime Extension: To formulate the objective of battery lifetime maximization and integrating with energy cost minimization, the maximization problem is translated into a minimization one. To this purpose, battery lifetime is estimated using its cumulative discharges and its DoD. For a battery cell which has been operated for a certain period of time and experienced k discharge events, the estimated lifetime, BL, can be calculated as follows:

$$BL = \frac{L_R D_R C_R}{\sum_{i=1}^{k} d_{eff}(i)} \tau \quad (3)$$

in which $C_R$ is rated amp-hour capacity at rated discharge current, $D_R$ is DoD for which rated cycle life was determined, and $L_R$ is cycle life at rated DoD and rated discharge current. $d_{eff}(i)$ is the effective discharge (ampere-hours) for a particular discharge event i and is calculated as follows:

$$d_{eff}(i) = \left(\frac{DoD(i)}{D_R}\right)^{x_1} e^{x_2\left(\frac{DoD(i)}{D_R}-1\right)} \frac{C_R}{C_A(i)} d_{act}(i) \quad (4)$$

in which DoD(i), $C_A(i)$, and $d_{act}(i)$ are DoD, actual capacity of a battery, and measured discharge ampere-hours for ith discharge event respectively. Coefficients $x_1$ and $x_2$ are calculated by applying a curve fitting procedure to cycle life versus DoD data available from the battery data sheet. To perform curve fitting task, particle swarm optimization (PSO) technique is employed. PSO is a curve fitting tool compatible with nonlinear battery characteristics.

Having the estimated life time, the system can evaluate the number of needed replacement for batteries for the total life of project. According to number of required replacement, equivalent uniform annual cost (EUAC) is calculated. Finally, once the EUAC is determined, the price of power extracted from the batteries is calculated by dividing EUAC by the expected annual kWh usage of the battery. In summary, the cost of battery usage (second objective, $J_2$) can be modeled as follows:

$$J_2 := \sum_{t=0}^{T} C_B(P_B(t), DoD(t))P_B(t) \qquad (5)$$

in which $P_B(t)$ is battery discharge power which is obtained from measured discharge ampere-hours at time t, and $C_B(P_B(t), DoD(t))$, is the price of battery power that is a function of discharge power and its DoD at time t.

By transferring battery's life time maximization problem into a battery's power cost minimization problem, we are able to embed two above-mentioned objectives into a single optimization problem in which the objective function, J, can be achieved as follows:

$$J := \sum_{t=0}^{T} C_G(t)P_G(t) + C_B(P_B(t), DoD(t))P_B(t) \qquad (6)$$

The operational and physical constraints of problem are listed as follows:

1) Supply-Demand balance which is an equality constraint and the main responsibility of management system. This constraint is formulated as follows:

$$P_G^D(t)+P_B(t)+P_{renew}^D(t)=D(t) \qquad (7)$$

which means the summation of generated power by grid, battery, and renewable source should be equal to demand at each time.

2) Battery state of charge (SoC) difference equation:

$$soc(t+1)=soc(t)-\alpha P_B(t)+\alpha P_G^B(t)+\alpha P_{renew}^B(t) \qquad (8)$$

in which soc(t) is battery SoC in ampere-hour (Ah) at time t, and $\alpha$ is a coefficient which changes kW unit into Ah.

3) Upper and lower bound for battery SoC which by considering the SoC difference equation (8) will be a dynamic inequality constraint:

$$soc^{min} \leq soc(t) \leq soc^{max} \qquad (9)$$

4) All decision variables ($P_G^D(t)$, $P_G^B(t)$, $P_{renew}^D(t)$, $P_{renew}^B(t)$, and $P_B(t)$) are physical variables. Therefore, they are always greater than or equal to zero:

$$P_G^D(t) \geq 0, P_G^B(t) \geq 0, P_B(t) \geq 0, \qquad (10)$$

$$P_{renew}^D(t) \geq 0, P_{renew}^D(t) \geq 0, \qquad$$

5) Renewable inequality constraint which states that the summation of $P_{renew}^D(t)$ and $P_{renew}^B(t)$ should be less than or equal to available renewable generation at each time. Thus, we have:

$$P_{renew}^D(t)+P_{renew}^B(t) \leq P_{renew}(t) \qquad (11)$$

in which $P_{renew}(t)$ is the available renewable power at time t and is obtained based on forecasted profile of renewable generations.

6) Peak shaving inequality constraint which equips the management system with the ability of performing peak shaving task. By satisfying this constraint, management system guarantees that the total extracted power from the grid at each time is less than a predetermined constant value, $P_{PSH}$. Therefore, we state this inequality constraint as follows:

$$P_G^D(t)+P_G^B(t) \leq P_{PSH} \qquad (12)$$

This constraint is an optional objective for management system and is not a mandatory task for normal type of operation.

For defining and solving optimization problem, it will be enough to pick $P_G^D(t)$, $P_G^B(t)$, $P_{renew}^D(t)$, and $P_{renew}^B(t)$ as decision variables since other variables can be described based on this parameters. Hence, the optimal dispatching problem for the finite horizon T becomes:

$$\min_{\substack{P_G^D, P_{renew}^D, \\ P_G^B, P_{renew}^B}} J := \sum_{t=0}^{T} C_G(t)P_G(t) + C_B(P_B(t), DoD(t))P_B(t)$$

subject to: (7)-(12)

Figure 2:
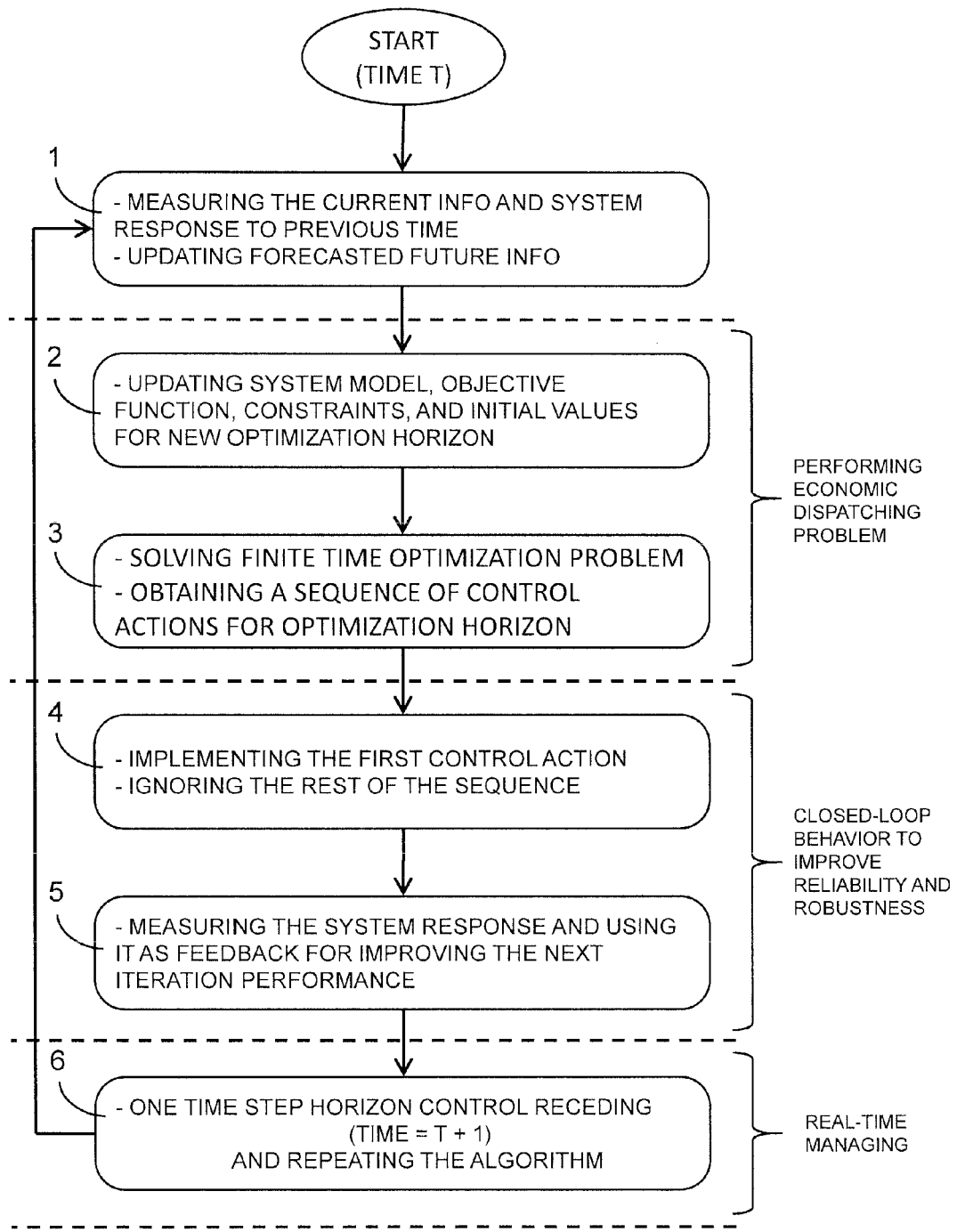
FIG. 2 shows an exemplary process for multi-objective energy management methods for micro-grids.
Figure 3A:
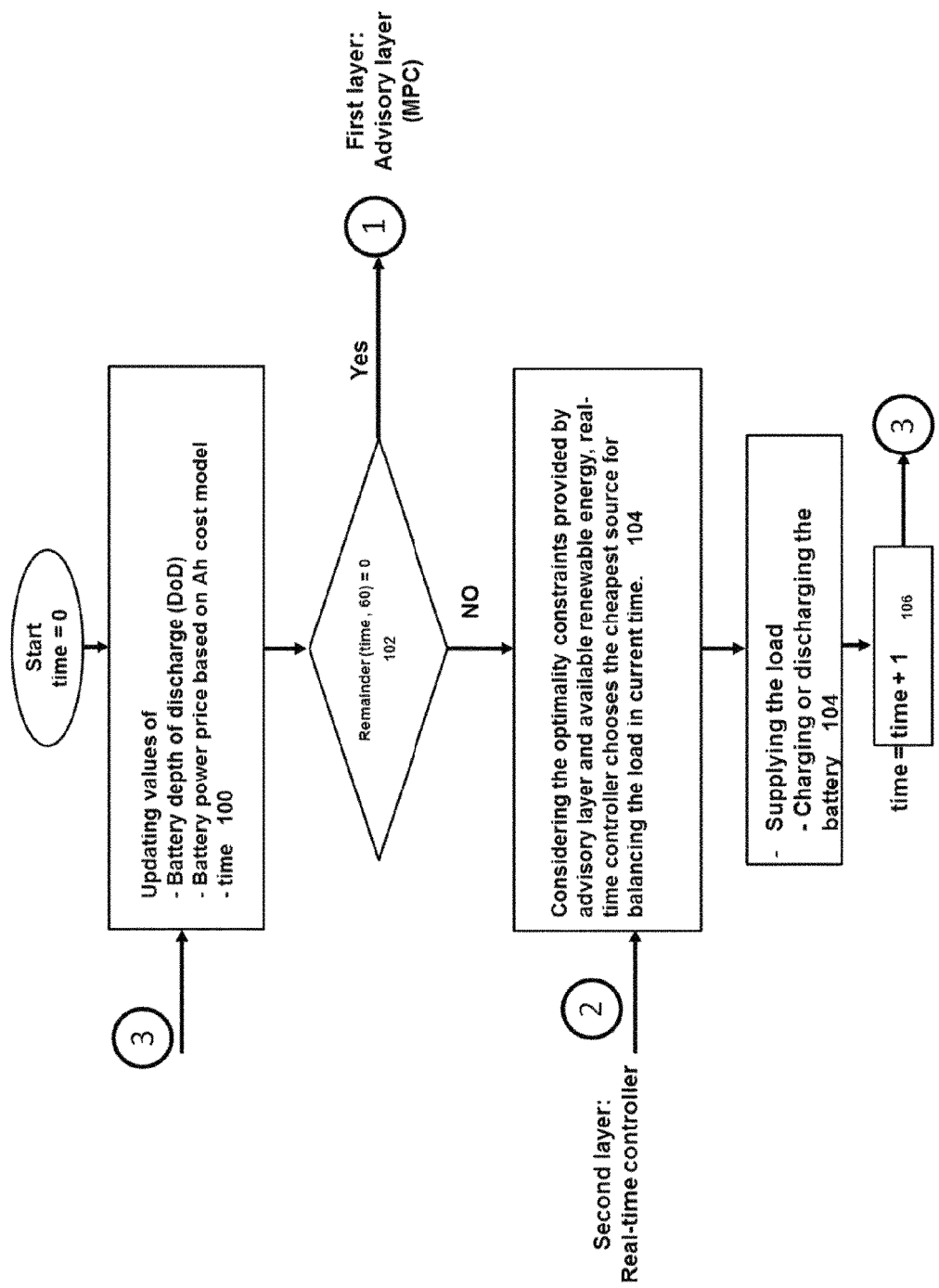
FIGS. 3A-3D shows two exemplary multi-objective management methods for long term optimizations with a real time controller and with battery lifetime maximization.
Figure 3B:
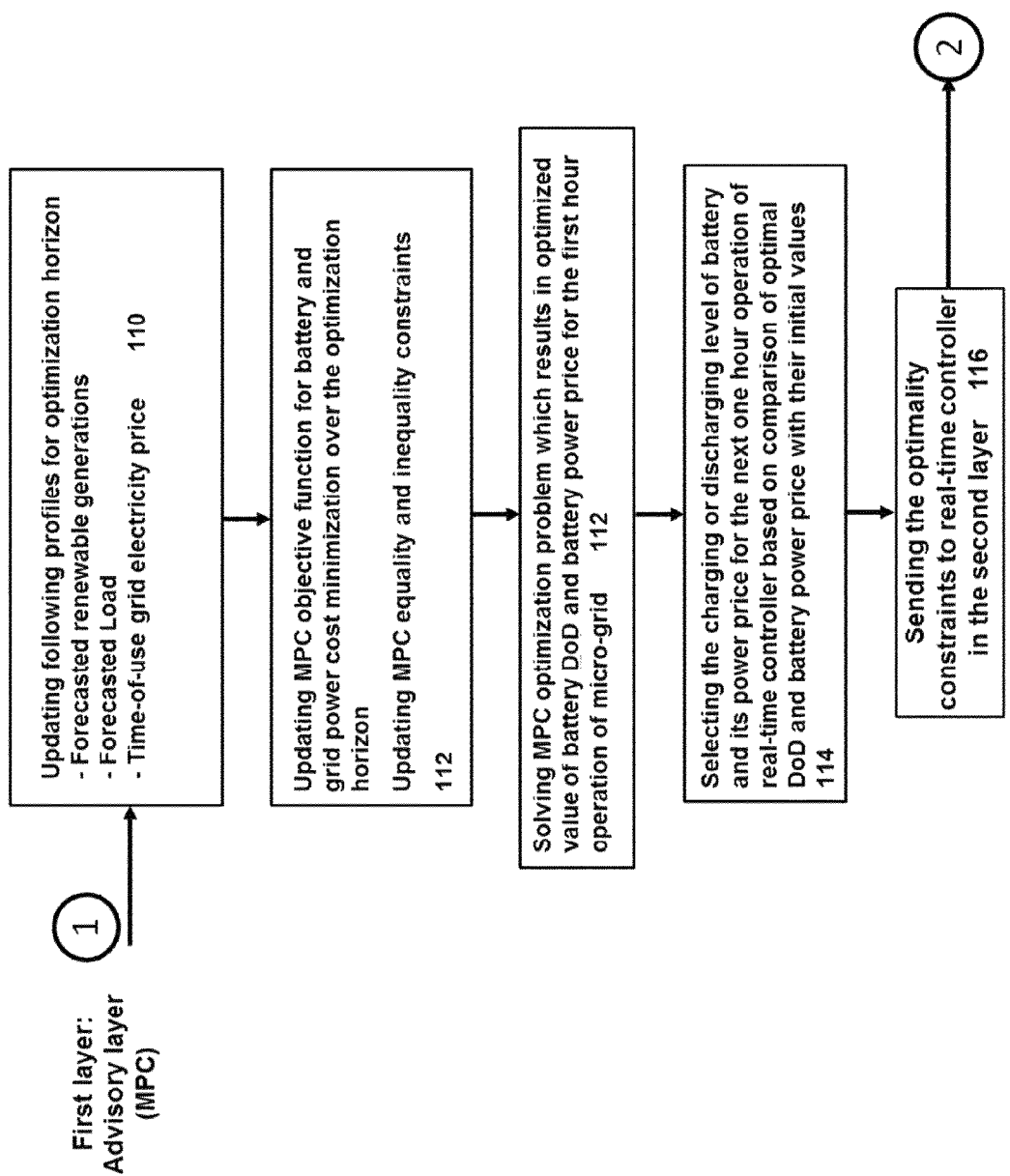
Figure 3C:
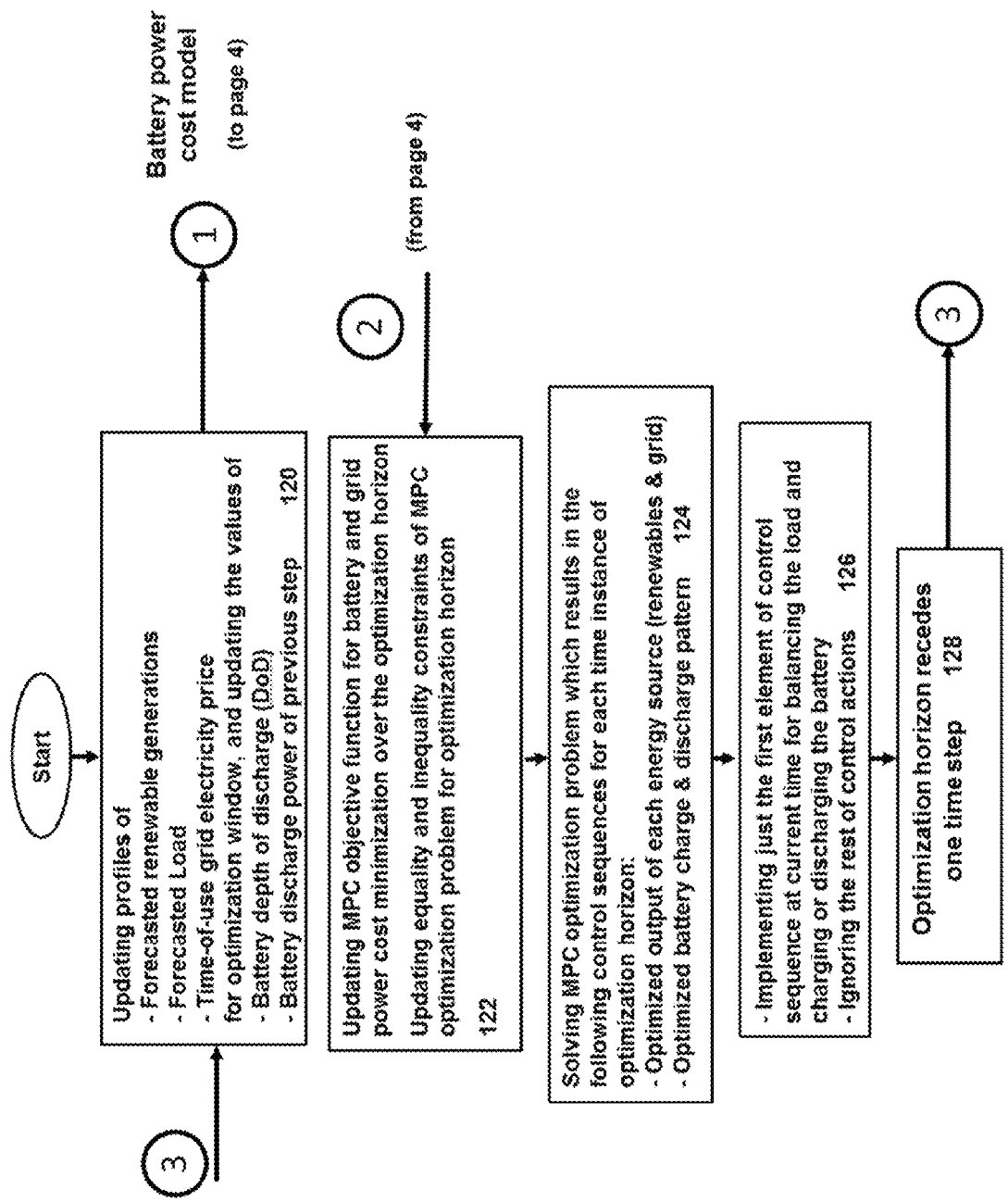
Figure 3D:
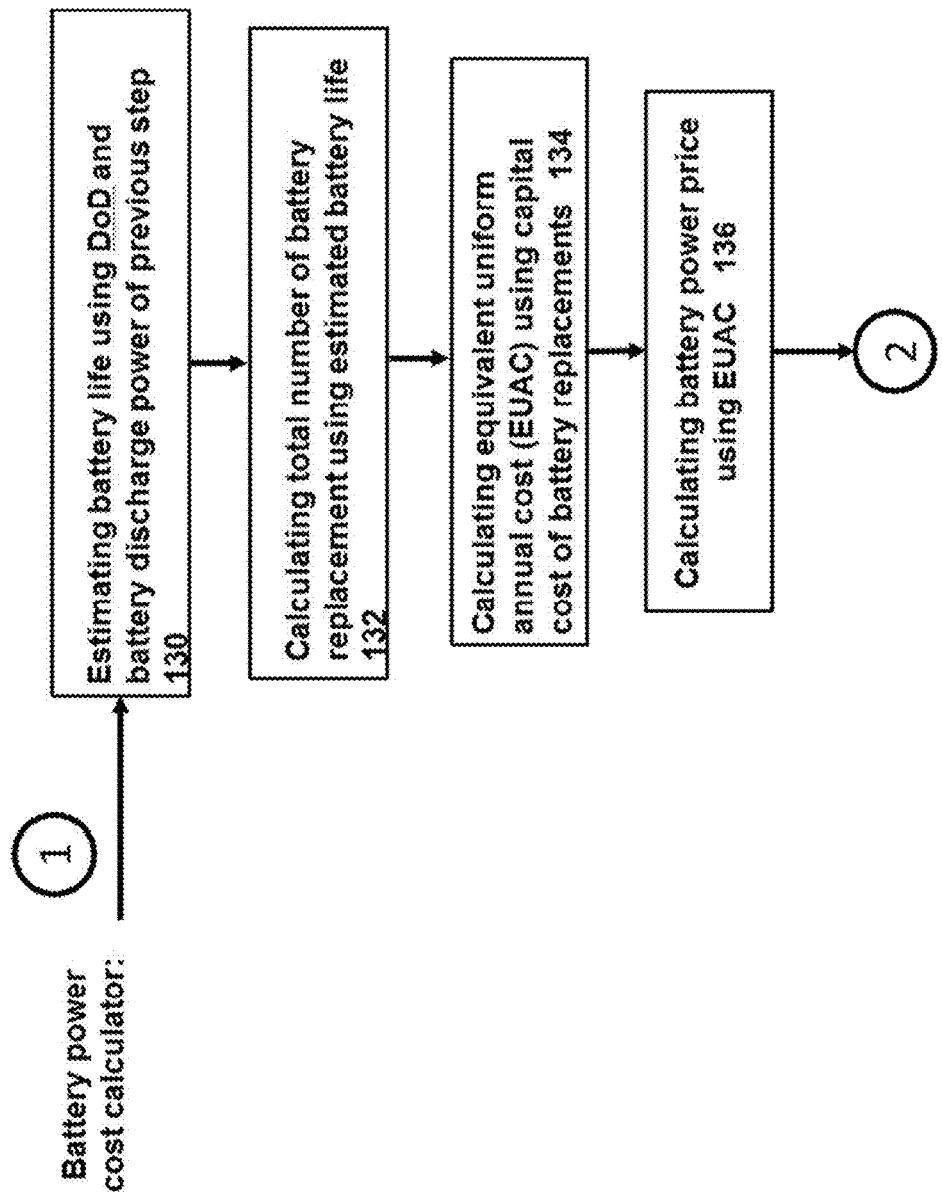

Next, a model predictive control (MPC) framework is described and applied to solve the proposed real-time management problem. MPC is a control methodology that utilizes a model of the system under control. Using the system model, MPC can predict the system behavior to different control actions. For making the model of operation for micro-grid, current and future information is needed including forecasted load and renewable generations profiles, time-of-use grid electricity rates, current battery SoC, SoC model for battery charging and discharge, battery power pricing model, among others. In this way, MPC will be able to perform the real-time management task based on the process of FIG. 2. As shown in FIG. 2:

Step 1: Current system information and system response to previous inputs are measured. In addition, forecasted profiles are updated for new optimization horizon.

Step 2: Based on update information, system model, optimization objective function, and constraints are updated.

Step 3: The proposed economic dispatching problem is solved which results in a sequence of control actions for each time instance of optimization horizon.

Step 4: The first control action is implemented which means the output of each energy source and battery is determined for current time. The rest of the control sequence will be ignored.

Step 5: System response (new level of battery SoC, battery power price, etc.) to injected control command is measured and utilized as a feedback for next iteration to improve system performance.

Steps 4 & 5 together help the management system to perform a closed-loop control algorithm. Closed-loop characteristic makes the MPC to be robust and reliable for dealing with errors in system modeling and forecasting the renewable generations and load profiles.

Step 6: Horizon control recedes just one time step and MPC repeats the algorithm by going back to step 1.

Step 6 lets the MPC act as an on-line manager for micro-grid which optimizes its behavior in every time step.

Figure 4A:
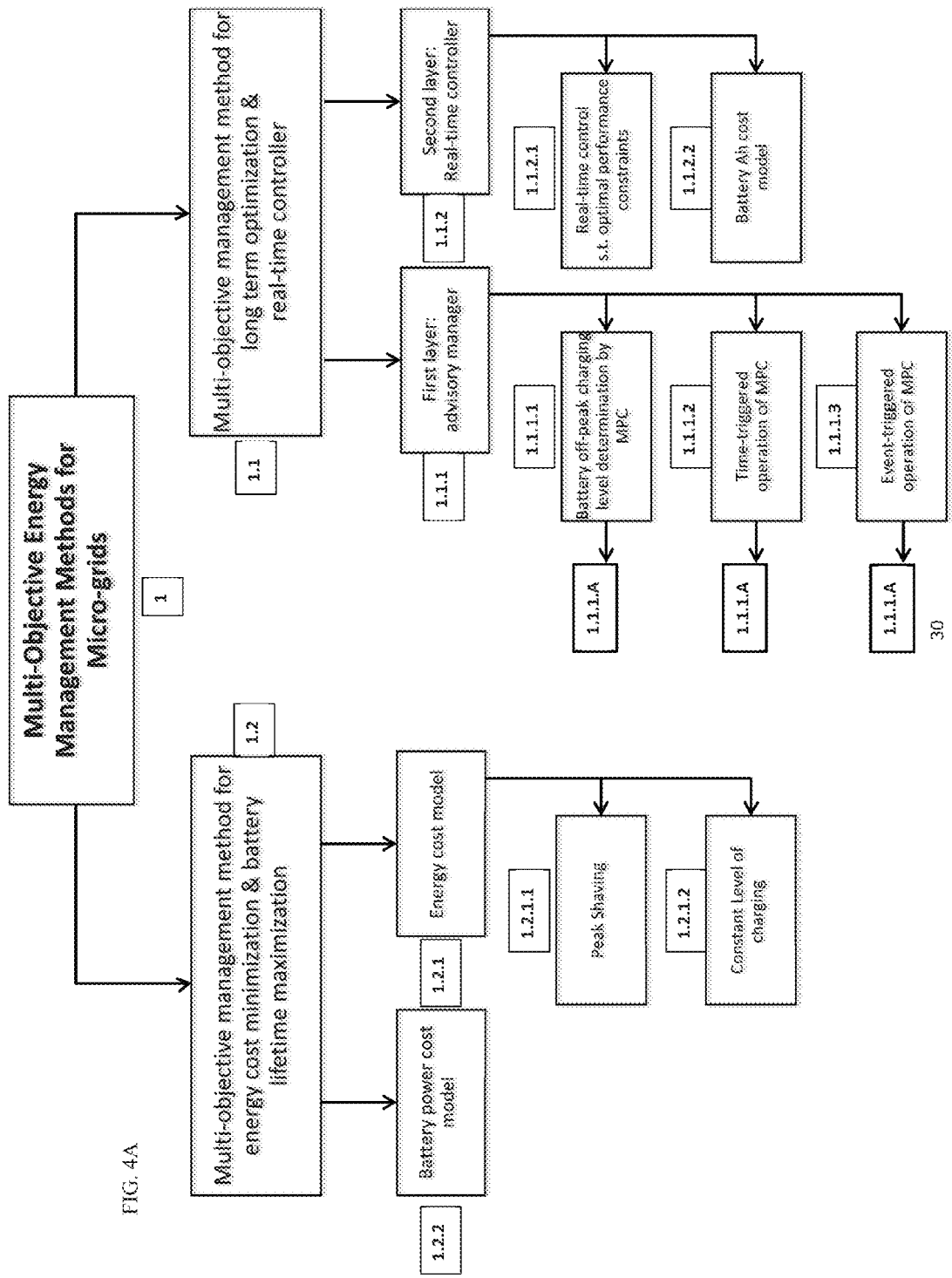
FIGS. 4A-4B shows another exemplary multi-objective energy management method for micro-grids.
Figure 4B:
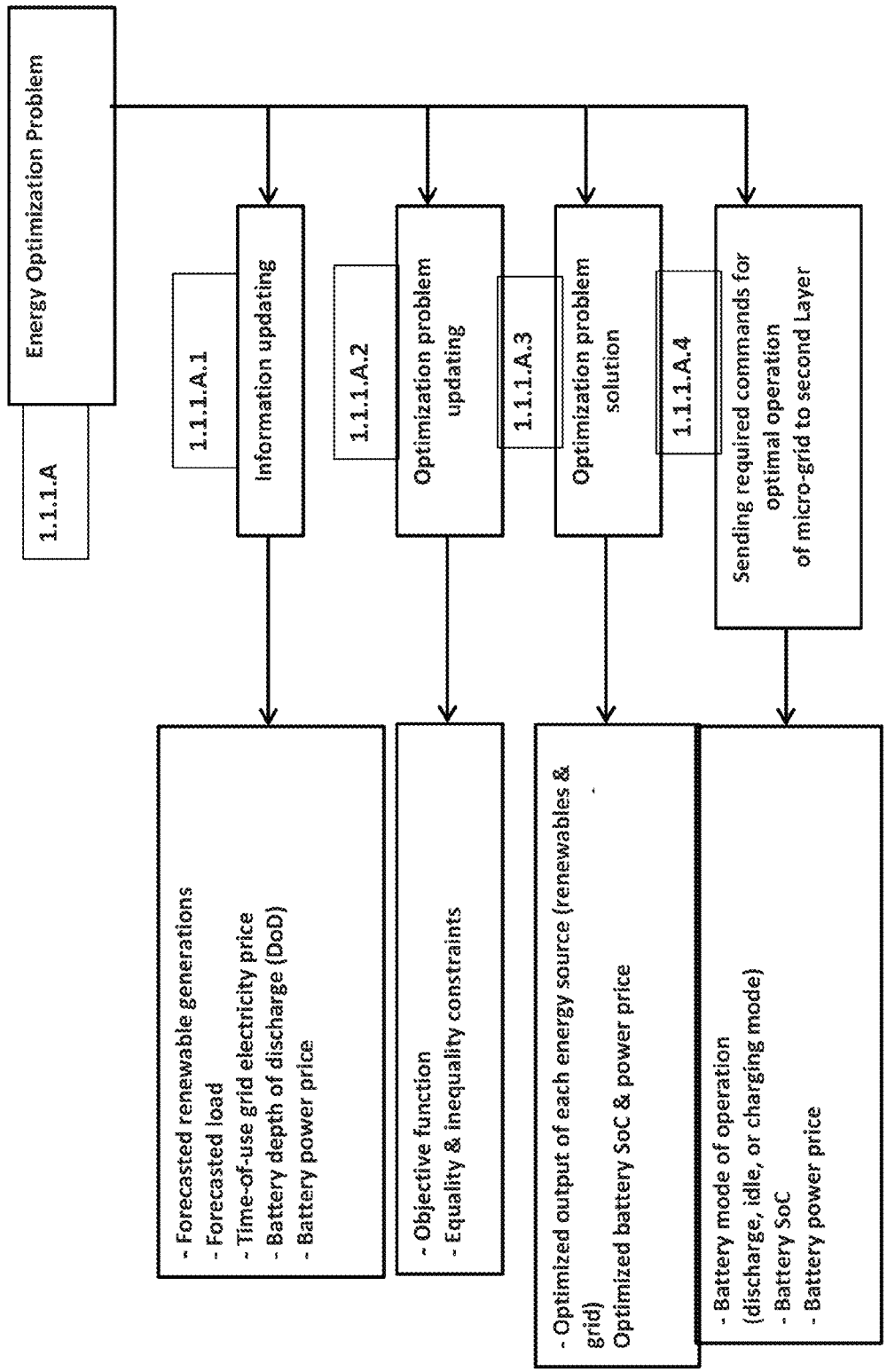

FIGS. 4A-4B shows other multi-objective energy management methods for micro-grids. In FIG. 4A, at the start, t=0, the process updates the time and the values of the battery depth of discharge (DoD) and battery power price based on an amper-hour cost model (100). In 102, the process checks if it is time for the advisory layer to run, which is hourly for one embodiment. If so, the process proceeds to connector 1 in FIG. 4B, and otherwise the process considers optimality constraints provided by the advisory layer and available renewable energy, and the real-time controller chooses the cheapest source for balancing the load in current time (104). Next, the process supplies the load and then determines whether to charge or discharge the battery (104). Time is incremented (106), and then the process jumps to connector 3 (FIG. 4C).

Turning now to FIG. 4B, from connector 1 of FIG. 4A, the process updates profiles for optimization horizon: forecasted renewable generations; forecasted load; and time-of-use grid electricity price, among others (110). Next, the process updates MPC objective function for battery and grid power cost minimization over the optimization horizon, and it also updates MPC equality and inequality constraints (112). The process then selects the charging or discharging level of battery and its power price for the next one hour operation of real-time controller based on comparison of optimal DoD and battery power price with their initial values (114). The process then sends the optimality constraints to real-time controller in the second layer (116) and jumps to connector 2 (FIG. 4C).

FIG. 4C shows exemplary multi-objective management method for energy cost minimization and battery lifetime maximization. The process first updates profiles of forecasted renewable generations, forecasted load, time-of-use grid electricity price for optimization window, and updates the values of battery depth of discharge (DoD) and battery discharge power of previous step (120). The process then updates the MPC objective function for battery and grid power cost minimization over the optimization horizon and also updates equality and inequality constraints of MPC optimization problem for optimization horizon (122). The process then solves the MPC optimization problem which results in the following control sequences for each time instance of optimization horizon: optimized output of each energy source (renewables & grid) and optimized battery charge & discharge pattern (124). The process then implements just the first element of control sequence at current time for balancing the load and charging or discharging the battery and ignores the rest of control actions (126). The optimization horizon recedes one time step (128) before the process jumps to connector 3.

FIG. 4D is a continuation of FIG. 4C. The process estimates the battery life using DoD and battery discharge power of previous step (130). The process then determines the total number of battery replacement using estimated battery life (132). The process determines equivalent uniform annual cost (EUAC) using capital cost of battery replacements (134) and determines the battery power price using EUAC (136) before looping back to connector 2 (FIG. 4C).

FIGS. 5A-5B shows an exemplary computer for implementing the multi-objective energy management methods for micro-grids 1 including methods for managing the micro-grid operation with different objective functions in order to achieve the most efficient performance 1.

In 1.1, the process includes multi-objective management method for long term optimization and real-time controller: a two-layer management method is used that minimizes the energy cost subject to system constraints such as the equality constraint between supply and demand. It has a long term optimizer in its first layer and a real-time controller in the second layer.

In 1.1.1, the first layer uses the MPC as the advisory manager. The advisory layer employs an MPC to solve a long term optimization problem by utilizing forecasted renewable generation and load profiles. The MPC results will be the optimality conditions which real-time controller uses as optimal performance targets in second layer. The advisory layer can be used in different strategies which will be explained below.

In 1.1.1.1, the battery off-peak charging level is done. A first strategy of using the advisory layer runs the MPC optimization problem once per day at 12:00 am. In this way, considering the forecasted availability of renewable energy for the next 24 hours, the MPC determines the optimal value for off-peak charging of battery by the grid. This optimal value is sent to real-time controller in second layer for implementation.

In 1.1.1.2, the process uses a time-triggered operation of MPC. A second strategy of using the advisory layer runs the MPC regularly for example every one hour. By doing this, MPC results provide hourly constraints for real-time controller which optimize the micro-grid performance.

In 1.1.1.3, the process uses an event-triggered operation of MPC. A third strategy of using the advisory layer is based on event-triggered type of operation. In this way, any time that real-time controller confronts with an unexpected event triggers the MPC in advisory layer to make the optimal decision for dealing with the event.

In 1.1.1.A, the process solves an energy optimization problem. This is the optimization problem which MPC should solve in any type of operation. The following steps are performed to solve the optimization:

In 1.1.1.A.1, information updating is done. First, required information for forming the optimization problem is updated. This information includes forecasted renewable generations, forecasted load, time-of-use grid electricity price, battery depth of discharge (DoD), and battery power price.

In 1.1.1.A.2, the optimization problem is updated: With the updated information, the objective function and constraints of optimization problem are updated.

In 1.1.1.A.3, the process determines an optimization problem solution: Solving the optimization problem, optimal output of each energy source (renewables & grid) and optimal battery SoC and battery power price are obtained.

In 1.1.1.A.4, the process sends required commands for optimal operation of micro-grid to second Layer. Considering the obtained optimal results, optimal battery mode of operation (discharge, idle, or charging mode), battery SoC, and battery power price are sent to real-time controller in second layer for implementation.

In 1.1.2, the second layer is a real-time controller: In the second layer, the management system controls the micro-grid behavior in a second-by-second basis.

In 1.1.2.1, the real-time control is subject to optimal performance constraints: For performing the second-by-second managing task, the real-time controller solves a one time-step optimization problem subject to advisory layer constraints and available renewable energy at current time. In this way, it guarantees the balance between generation and consumption within the micro-grid at each time step while it satisfies the optimal performance constraints provided by MPC at advisory layer.

In 1.1.2.2, the process determines a battery Amp-hour cost model: For solving the optimization problem in second layer and determining the cheapest source of energy for supply the load, it is needed to model the cost of power extracted from the battery. To this purpose, the Ah cost model has been employed which calculates the price of power stored in the battery.

In 1.2, a multi-objective management method for energy cost minimization & battery lifetime maximization is done. The process determines a dispatching strategy for energy sources within a micro-grid which not only minimizes the marginal cost of operation but also maximizes the storage unit lifetime.

In 1.2.1, an energy cost model is built. In order to minimize the marginal cost of micro-grid operation, one objective function has been dedicated to energy cost models for energy sources. To this end, a linear cost model has been described for each source of energy which is the multiplication of marginal cost of source and its level of generation.

In 1.2.1.1, peak shaving is determined. To perform the peak shaving task, an inequality constraint is added to the problem which restricts the total power extracted from the grid for both load supplying and battery charging at each time instance.

In 1.2.1.2, the process determines a constant level of charging: Due to physical limitations of storage package, battery can be charged just by a constant level of charging. Hence, an equality constraint has been considered in optimization problem which lets the charging power to be either the constant level or zero.

In 1.2.2, the process determines a battery power cost model: To integrate the battery lifetime maximization objective and energy cost minimization objective into one optimization problem, we have utilized a model which translates the battery lifetime maximization objective into a battery power cost minimization one.

As discussed above, the multi-objective management system to control the operation of a micro-grid. Two objectives are focused on to obtain the optimal performance of the micro-grid. The first objective is the minimization of energy operational cost; and the second one is the maximization of battery lifetime. To implement the management process, MPC is used as a powerful solution method to solve the underlying optimization problem.

To investigate the performance of proposed management strategy, a micro-grid including local renewable generations, grid connection, energy storage unit and a load was simulated in MATLAB environment. We compared the performance of MPC algorithm with static methods, and the MPC method obtains 21.6% more saving in energy cost. To demonstrate the effectiveness of considering battery lifetime extension objective, a simulation of one month operation of micro-grid shows that, by considering battery life span maximization objective, the MPC is able to operate the battery for its whole rated life.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Those skilled in the art can now appreciate from the foregoing description that the broad teachings of the present invention can be implemented in a variety of forms. As can be appreciated, steps of methods disclosed and claimed can be performed in an order that is different than that described and claimed herein without departing from the spirit of the present invention. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method to perform multi-objective energy management of micro-grids, comprising:
controlling a charge or discharge of a battery cell;
providing an advisory layer with a Model Predictive Control (MPC) as a long term scheduler, wherein the advisory layer determines an optimal set point or reference trajectory to reduce cost of energy;
determining battery off-peak charging level by the MPC;
providing a real-time layer coupled to the advisory layer with a real-time controller that guarantees a real-time second-by-second balance between supply and demand, subject to the optimal setpoint or trajectory generated by the advisory layer;
optimizing energy cost using forecasted renewable generation, load, time-of-use electricity price, battery depth of discharge, and battery power price;
maximizing battery lifetime and integrating with energy cost minimization, wherein the battery cell which has been operated for a certain period of time and experienced k discharge events, has an estimated lifetime, BL, as follows:

$$BL = \frac{L_R D_R C_R}{\sum_{i=1}^{k} d_{\textit{eff}}(i)} \tau$$

in which $C_R$ is rated amp-hour capacity at rated discharge current, $D_R$ is DoD for which rated cycle life was determined, $L_R$ is cycle life at rated DoD and rated discharge current, $d_{\textit{eff}}(i)$ is the effective discharge (ampere-hours) for a particular discharge event i calculated as:

$$d_{\textit{eff}}(i) = \left(\frac{DoD(i)}{D_R}\right)^{x_1} e^{x_2\left(\frac{DoD(i)}{D_R} - 1\right)} \frac{C_R}{C_A} d_{\textit{act}}(i)$$

where DoD(i), $C_A(i)$, and $d_{\textit{act}}(i)$ are DoD, actual capacity of a battery, and measured discharge ampere-hours for the ith discharge event respectively, and coefficients $X_1$ and $X_2$ are calculated by applying a curve fitting procedure to cycle life versus DoD data;
transferring the battery's life time maximization into a power cost minimization problem such that energy cost and cost of battery usage is defined by:

$$J := \sum_{t=0}^{T} C_G(t) P_G(t) + C_B(P_B(t), DoD(t)) P_B(t)$$

in which T is optimization horizon, $P_G(t)$ is imported power from grid at time t, $C_G(t)$ is grid power price at time t that is extracted based on time-of-use grid electricity rates information, $P_B(t)$ is battery discharge power which is obtained from measured discharge ampere-hours at time t, and $C_B(P_B(t), DoD(t))$ is the price of battery power that is a function of discharge power and its DoD at time t
that is subject to the following constraints including:
1) supply-demand balance defined by $$P_G^D(t) + P_B(t) + P_{renew}^D(t) = D(t)$$

where $P_G^D(t)$ is the power generated by the grid and sent to a demand node at time t, $P_{renew}^D(t)$ is the power from renewables at time t sent to the demand node, and D(t) is the demand at time t;
2) battery state of charge (SoC) difference defined by $$soc(t+1) = soc(t) - \alpha P_B(t) + \alpha P_G^B(t) + \alpha P_{renew}^B(t)$$

where soc(t) is battery SoC in ampere-hour (Ah) at time t, α is a coefficient which changes kW into Ah, $P_G^B(t)$ is the power generated by the grid and stored in the battery at time t, and $P_{renew}^B(t)$ is the power generated by renewables and stored in the battery at time t;
3) upper and lower bound for battery SoC which by considering the SoC difference is a dynamic inequality constraint defined by $$soc^{min} \leq soc(t) \leq soc^{max}$$

where $soc^{min}$ is a minimum state of charge for batteries and $soc^{max}$ is a maximum state of charge for batteries and soc(t) is state of charge at time t 4) all decision variables $P_G^D(t), P_G^B(t), P_{renew}^D(t), P_{renew}^B(t), P_B(t)$ are always greater than or equal to zero;
5) renewable inequality constraint which states that the summation of $P_{renew}^D(t)$ and $P_{renew}^B(t)$ is less than or equal to available renewable generation at each time (t) defined by $$P_{renew}^D(t) + P_{renew}^B(t) \leq P_{renew}(t)$$

in which $P_{renew}(t)$ is the available renewable power at time t and is obtained based on forecasted profile of renewable generations; and
6) peak shaving inequality constraint to guarantee that total extracted power from the grid at each time is less than a predetermined constant value $P_{PSH}$ defined by $$P_G^D(t) + P_G^B(t) \leq P_{PSH}.$$

2. The method of claim 1, comprising time-triggering the operation of the MPC.
3. The method of claim 1, comprising event-triggering the operation of the MPC.
4. The method of claim 1, wherein the advisory layer receives feedback from the real-time layer in a closed loop.
5. The method of claim 1, wherein the real-time controller applies a battery ampere-hour cost model.
6. The method of claim 1 comprising sending optimal commands for the micro-grid to the real-time layer.
7. A method for multi-objective management of a storage device, comprising:
generating a battery power cost model;
generating an energy cost model;
controlling a charge or discharge of the battery storage device;
dispatching energy sources from a micro-grid to minimize a marginal cost of operation and maximize a storage unit lifetime over a time horizon;
utilizing a peak-shaving inequality constraint such that the total extracted power from the grid at each time is less than a predetermined constant value;
optimizing energy cost using forecasted renewable generation, load, time-of-use electricity price, battery depth of discharge, and battery power price;
maximizing battery lifetime and integrating with energy cost minimization, wherein a battery cell which has been operated for a certain period of time and experienced k discharge events, has an estimated lifetime, BL, as follows:

$$BL = \frac{L_R D_R C_R}{\sum_{i=1}^{k} d_{\textit{eff}}(i)} \tau$$

in which $C_R$ is rated amp-hour capacity at rated discharge current, $D_R$ is DoD for which rated cycle life was determined, $L_R$ is cycle life at rated DoD and rated discharge current, $d_{\textit{eff}}(i)$ is the effective discharge (ampere-hours) for a particular discharge event i calculated as:

$$d_{\textit{eff}}(i) = \left(\frac{DoD(i)}{D_R}\right)^{x_1} e^{x_2\left(\frac{DoD(i)}{D_R} - 1\right)} \frac{C_R}{C_A} d_{\textit{act}}(i)$$

where DoD(i), $C_A(i)$, and dact(i) are DoD, actual capacity of a battery, and measured discharge ampere-hours for the ith discharge event respectively, and coefficients $X_1$ and $X_2$ are calculated by applying a curve fitting procedure to cycle life versus DoD data and transferring the battery's life time maximization into a power cost minimization problem such that energy cost and and cost of battery usage is defined by:

$$J := \sum_{t=0}^{T} C_G(t)P_G(t) + C_B(P_B(t), DoD(t))P_B(t)$$

in which T is optimization horizon, $P_G(t)$ is imported power from grid at time t, $C_G(t)$ is grid power price at time t that is extracted based on time-of-use grid electricity rates information, $P_B(t)$ is battery discharge power which is obtained from measured discharge ampere-hours at time t, and $C_B(P_B(t), DoD(t)$ is the price of battery power that is a function of discharge power and its DoD at time t that is subject to the following constraints including:
1) supply-demand balance defined by $$P_G^D(t) + P_B(t) + P_{renew}^D(t) = D(t)$$

where $P_G^D(t)$ is the power generated by the grid and sent to a demand node at time t, $P_{renew}^D(t)$ is the power from renewables at time t sent to the demand node, and $D(t)$ is the demand at time t;
2) battery state of charge (SoC) difference defined by $$soc(t+1) = soc(t) - \alpha P_B(t) + \alpha P_G^B(t) + \alpha P_{renew}^B(t)$$

where $soc(t)$ is battery SoC in ampere-hour (Ah) at time t, and a is a coefficient which changes kW into Ah, $P_G^B(t)$ is the power generated by the grid and stored in the battery at time t, and $P_{renew}^B(t)$ is the power generated by renewables and stored in the battery at time t;
3) upper and lower bound for battery SoC which by considering the SoC difference is a dynamic inequality constraint defined by $$soc^{min} \leq soc(t) \leq soc^{max}$$

where $soc^{min}$ is a minimum state of charge for batteries and $soc^{max}$ is a maximum state of charge for batteries and $soc(t)$ is state of charge at time t
4) all decision variables $P_G^D(t), P_G^B(t), P_{renew}^D(t), P_{renew}^B(t), P_B(t)$ are always greater than or equal to zero;
5) renewable inequality constraint which states that the summation of $P_{renew}^D(t)$ and $P_{renew}^B(t)$ is less than or equal to available renewable generation at each time (t) defined by $$P_{renew}^D(t) + P_{renew}^B(t) \leq P_{renew}(t)$$

in which $P_{renew}(t)$ is the available renewable power at time t and is obtained based on forecasted profile of renewable generations; and
6) peak shaving inequality constraint to guarantee that total extracted power from the grid at each time is less than a predetermined constant value $P_{PSH}$ defined by $$P_G^D(t) + P_G^B(t) \leq P_{PSH}$$

8. The method of claim 7, comprising performing peak shaving wherein an inequality constraint is added to restrict a total power extracted from the grid for both load supplying and battery charging at each time instance.

9. The method of claim 7, comprising charging the battery at a constant level by considering an equality constraint in an optimization problem which lets a charging power to be either a constant level or zero.

10. The method of claim 7, comprising determining a first objective function $J_1$ as a grid power cost over an optimization window as:

$$J_1 := \sum_{t=0}^{T} C_G(t)P_G(t)$$

11. The method of claim 7, comprising determining a second objective function $J_2$ as a grid power cost over an optimization window as:

$$J_2 := \sum_{t=0}^{T} C_B(P_B(t), DoD(t))P_B(t)$$

12. A multi-objective energy management system, comprising:
a processor coupled to a micro-grid;
computer code for utilizing a peak-shaving inequality constraint such that the total extracted power from the grid at each time is less than a predetermined constant value;
computer code for optimizing energy cost using forecasted renewable generation, load, time-of-use electricity price, battery depth of discharge, and battery power price;
computer code for controlling a charge or discharge of a battery cell
computer code for maximizing battery lifetime and integrating with energy cost minimization, wherein the battery cell which has been operated for a certain period of time and experienced k discharge events, has an estimated lifetime, BL, as follows:

$$BL = \frac{L_R D_R C_R}{\sum_{i=1}^{k} d_{eff}(i)} \tau$$

in which $C_R$ is rated amp-hour capacity at rated discharge current, $D_R$ is DoD for which rated cycle life was determined, $L_R$ is cycle life at rated DoD and rated discharge current, $d_{eff}(i)$ is the effective discharge (ampere-hours) for a particular discharge event i calculated as:

$$d_{eff}(i) = \left(\frac{DoD(i)}{D_R}\right)^{x_1} e^{x_2\left(\frac{DoD(i)}{D_R} - 1\right)} \frac{C_R}{C_A} d_{act}(i)$$

where $DoD(i)$, $C_A(i)$, and $dact(i)$ are DoD, actual capacity of a battery, and measured discharge ampere-hours for the ith discharge event respectively, and coefficients $X_1$ and $X_2$ are calculated by applying a curve fitting procedure to cycle life versus DoD data;
a long term scheduler in an advisory layer with a Model Predictive Control (MPC); and
a real-time controller that guarantees a second-by-second balance between supply and demand, subject to one or more optimality constraints provided by the advisory layer; wherein the battery's life time maximization is transferred into a power cost minimization problem such that energy cost and cost of battery usage is defined by:

$$J := \sum_{t=0}^{T} C_G(t)P_G(t) + C_B(P_B(t), DoD(t))P_B(t)$$

in which T is optimization horizon, $P_G(t)$ is imported power from grid at time t, $C_G(t)$ is grid power price at time t that is extracted based on time-of-use grid electricity rates information, $P_B(t)$ is battery discharge power which is obtained from measured discharge ampere-hours at time t, and $C_B(P_B(t), DoD(t))$ is the price of battery power that is a function of discharge power and its DoD at time t
that is subject to the following constraints including:
1) supply-demand balance defined by $$P_G^D(t)+P_B(t)+P_{renew}^D(t)=D(t)$$

where $P_G^D(t)$ is the power generated by the grid and sent to a demand node at time t, $P_{renew}^D(t)$ is the power from renewables at time t sent to the demand node, and $D(t)$ is the demand at time t;
2) battery state of charge (SoC) difference defined by $$soc(t+1)=soc(t)-\alpha P_B(t)+\alpha P_G^B(t)+\alpha P_{renew}^B(t)$$

where $soc(t)$ is battery SoC in ampere-hour (Ah) at time t, and a is a coefficient which changes kW into Ah, $P_G^B(t)$ is the power generated by the grid and stored in the battery at time t, and $P_{renew}^B(t)$ is the power generated by renewables and stored in the battery at time t;
3) upper and lower bound for battery SoC which by considering the SoC difference is a dynamic inequality constraint defined by $$soc^{min} \leq soc(t) \leq soc^{max}$$

where $soc^{min}$ is a minimum state of charge for batteries and $soc^{max}$ is a maximum state of charge for batteries and $soc(t)$ is state of charge at time t
4) all decision variables $P_G^D(t), P_G^B(t), P_{renew}^D(t), P_{renew}^B(t), P_B(t)$ are always greater than or equal to zero;
5) renewable inequality constraint which states that the summation of $P_{renew}^D(t)$ and $P_{renew}^B(t)$ is less than or equal to available renewable generation at each time (t) defined by $$P_{renew}^D(t)+P_{renew}^B(t) \leq P_{renew}(t)$$

in which $P_{renew}(t)$ is the available renewable power at time t and is obtained based on forecasted profile of renewable generations; and
6) peak shaving inequality constraint to guarantee that total extracted power from the grid at each time is less than a predetermined constant value $P_{PSH}$ defined by $$P_G^D(t)+P_G^B(t) \leq P_{PSH}$$

13. An energy storage system with multi-objective management, comprising:
an energy storage system;
a computer to control the charging of the energy storage system, the computer executing:
computer code for generating a battery power cost model and an energy cost model;
computer code for controlling a charge or discharge of the battery storage device;
computer code for integrating an energy cost minimization and battery life maximization objective functions for optimizing a Model Predictive Control (MPC);
computer code for dispatching energy sources from a micro-grid to minimize a marginal cost of operation and maximize the storage unit lifetime;
computer code for utilizing a peak-shaving inequality constraint such that the total extracted power from the grid at each time is less than a predetermined constant value;
computer code for optimizing energy cost using forecasted renewable generation, load, time-of-use electricity price, battery depth of discharge, and battery power price; and
computer code for maximizing battery lifetime and integrating with energy cost minimization, wherein a battery cell which has been operated for a certain period of time and experienced k discharge events, has an estimated lifetime, BL, as follows:

$$BL = \frac{L_R D_R C_R}{\sum_{i=1}^{k} d_{eff}(i)} \tau$$

in which $C_R$ is rated amp-hour capacity at rated discharge current, $D_R$ is DoD for which rated cycle life was determined, $L_R$ is cycle life at rated DoD and rated discharge current, $d_{eff}(i)$ is the effective discharge (ampere-hours) for a particular discharge event i calculated as:

$$d_{eff}(i) = \left(\frac{DoD(i)}{D_R}\right)^{x_1} e^{x_2\left(\frac{DoD(i)}{D_R}-1\right)} \frac{C_R}{C_A} d_{act}(i)$$

where $DoD(i)$, $C_A(i)$, and $dact(i)$ are DoD, actual capacity of a battery, and measured discharge ampere-hours for the ith discharge event respectively, and coefficients $X_1$ and $X_2$ are calculated by applying a curve fitting procedure to cycle life versus DoD data; and
computer code that transfers the battery's life time maximization into a power cost minimization problem such that energy cost and and cost of battery usage is defined by:

$$J := \sum_{t=0}^{T} C_G(t)P_G(t) + C_B(P_B(t), DoD(t))P_B(t)$$

in which T is optimization horizon, $P_G(t)$ is imported power from grid at time t, $C_G(t)$ is grid power price at time t that is extracted based on time-of-use grid electricity rates information, $P_B(t)$ is battery discharge power which is obtained from measured discharge ampere-hours at time t, and $C_B(P_B(t), DoD(t))$ is the price of battery power that is a function of discharge power and its DoD at time t
that is subject to the following constraints including:
1) supply-demand balance defined by $$P_G^D(t)+P_B(t)+P_{renew}^D(t)=D(t)$$

where $P_G^D(t)$ is the power generated by the grid and sent to a demand node at time t, $P_{renew}^D(t)$ is the power from renewables at time t sent to the demand node, and $D(t)$ is the demand at time t;

2) battery state of charge (SoC) difference defined by $$soc(t+1)=soc(t)-\alpha P_B(t)+\alpha P_G^B(t)+\alpha P_{renew}^B(t)$$

where soc(t) is battery SoC in ampere-hour (Ah) at time t, and $\alpha$ is a coefficient which changes kW into Ah, $P_G^B(t)$ is the power generated by the grid and stored in the battery at time t, and $P_{renew}^B(t)$ is the power generated by renewables and stored in the battery at time t;

3) upper and lower bound for battery SoC which by considering the SoC difference is a dynamic inequality constraint defined by $$soc^{min} \leq soc(t) \leq soc^{max}$$

where $soc^{min}$ is a minimum state of charge for batteries and $soc^{max}$ is a maximum state of charge for batteries and soc(t) is state of charge at time t 4) all decision variables $P_G^D(t), P_G^B(t), P_{renew}^D(t), P_{renew}^B(t), P_B(t)$ are always greater than or equal to zero;

5) renewable inequality constraint which states that the summation of $P_{renew}^D(t)$ and $P_{renew}^B(t)$ is less than or equal to available renewable generation at each time (t) defined by $$P_{renew}^D(t)+P_{renew}^B(t) \leq P_{renew}(t)$$

in which $P_{renew}(t)$ is the available renewable power at time t and is obtained based on forecasted profile of renewable generations; and 6) peak shaving inequality constraint to guarantee that total extracted power from the grid at each time is less than a predetermined constant value $P_{PSH}$ defined by $$P_G^D(t)+P_G^B(t) \leq P_{PSH}$$

14. The system of claim 13, comprising computer code for performing peak shaving wherein an inequality constraint is added to restrict a total power extracted from the grid for both load supplying and battery charging at each time instance.

15. The system of claim 13, comprising computer code for charging the battery at a constant level by considering an equality constraint in an optimization problem which lets a charging power to be either a constant level or zero.

16. The system of claim 13, comprising computer code for determining a first objective function Ji as a grid power cost over an optimization window as:

$$J_1 := \sum_{t=0}^{T} C_G(t)P_G(t).$$

17. The method of claim 13, comprising computer code for determining a second objective function $J_2$ as a grid power cost over an optimization window as:

$$J_2 := \sum_{t=0}^{T} C_B(P_B(t), DoD(t))P_B(t)$$

* * * * *